United States Patent

Ban

[15] 3,684,297

[45] Aug. 15, 1972

[54] TAPE CARTRIDGE PLAY CONTROL APPARATUS

[72] Inventor: Itsuki Ban, 829, Higashi-Oizumimachi, Nerima-ku, Tokyo-to, Japan

[22] Filed: May 19, 1970

[21] Appl. No.: 38,779

[52] U.S. Cl. ....................................................274/4 B

[51] Int. Cl. ..............................................G11b 23/04

[58] Field of Search........274/4 A, 4 B, 4 C, 4 D, 4 E, 274/4 F, 11 A, 11 B, 11 C, 11 D

[56] References Cited

UNITED STATES PATENTS

| | | | |
|---|---|---|---|
| 2,868,891 | 1/1959 | Brewster | 274/4 E X |
| 3,146,316 | 8/1964 | Knoth | 274/4 E X |
| 3,524,651 | 8/1970 | Ketzer | 274/4 E |
| 3,542,370 | 11/1970 | Laa | 274/4 E |

*Primary Examiner*—Harry N. Haroian
*Attorney*—Jacobs & Jacobs

[57] ABSTRACT

A tape cartridge play control apparatus for an endless magnetic tape cartridge in a play position comprises a moving means for reciprocating a retention member between two positions where the cartridge is urged to the play position or not urged thereto by use of rotational force of a rotary capstan for driving the tape within the cartridge in cooperation with the pinch roller within the cartridge, and a control means for controlling operating of the moving means whereby the play of the cartridge is automatically ended in response to movement of the retention member under influence of the control means away from the position where the cartridge is brought to the play position.

6 Claims, 4 Drawing Figures

TAPE CARTRIDGE PLAY CONTROL APPARATUS

BACKGROUND OF THE INVENTION

This invention relates to an endless magnetic tape cartridge player, and more particularly to a novel tape cartridge play control apparatus capable of retracting a tape cartridge from its play position to end the play of the cartridge.

In general, the endless magnetic tape cartridge is normally and manually inserted in the tape cartridge player and engaged in play mode. One of the conventional expedients is that a spring-pressed roller is pressed against the inclined wall of a notch formed on the side wall of the cartridge to exert the forward force in the cartridge thereby urging the cartridge to the play position with respect to the tape driving capstan and magnetic head. In order to end the play of the cartridge which has been held and played in the play position under the aforementioned condition, it has been customary to manually remove the cartridge from the play position against the forward force derived from the spring-pressed roller. When it is desired to mechanically end the play of the cartridge instead of manual operation, the cartridge may be directly removed from the play position by driving force generated from a solenoid with a plunger. Disadvantages derived from the above-mentioned expedients are such that pressure between the pinch roller within the cartridge and the tape driving capstan amounts to about 1–2 kg, and thus much strength is needed to move the cartridge out of the play position, and that sliding friction acts between the cartridge and the player deck to thus require large scale and expensive solenoid and power in excess of 50 watts to be consumed. In addition, since the large dimensioned solenoid generates the large impact sound when it is operated, sound instruments would undesirably be affected thereby. Such solenoid will require much electricity to be consumed so that it is not practicable for the tape cartridge player depending upon the battery as main power.

SUMMARY OF THE INVENTION

It is a primary object of the invention to provide a tape cartridge play control apparatus for an endless magnetic tape cartridge player, including a retention member which places a tape cartridge in the play position with respect to the capstan and magnetic head, the retention member being moved from a position where the cartridge is urged the play position to diminish pressure between the capstan and the pinch roller within the cartridge to thereby end the tape driving.

Another object of the invention is to provide a tape cartridge play control apparatus for an endless magnetic tape cartridge player, including a retention member which is adapted to be moved in relation to rotation of a frictional idler wheel rotatably driven by selective abutment with the capstan thereby using no additional drive force for drive of the retention member.

A further object of the invention is to provide a tape cartridge play control apparatus for an endless magnetic tape cartridge player, including a stopper means which retains the retention member in a first position where the cartridge is urged to the play position and in a second position where the cartridge is prevented from its play, the retention member being automatically moved from the first position into the second position or vice versa in response to control under operation of the stopper means.

Still another object of the invention is to provide a tape cartridge play control apparatus for an endless magnetic tape cartridge player, wherein the stopper means is retained in the first position in response to detection of a conductive patch on the tape to thus release retention of the retention member whereby the retention member is moved from the first position to end the tape running.

These and other objects of the invention will be apparent from the following description and accompanying drawings in which:

BRIEF DESCRIPTION OF THE DRAWINGS

FIG. 1 illustrates one embodiment of tape cartridge play control apparatus according to the invention, wherein the reference numeral 10 designates a horizontal deck which is provided within a player housing (not shown) for playing an endless magnetic tape cartridge 11. Much of the mechanism disposed beneath the deck 10 is omitted since it forms no part of the present invention. However, there shown on the deck 10 are a rotary capstan 15 for driving an endless magnetic tape 12 within the cartridge 11 in cooperation with a pinch roller 13 mounted in the cartridge 11, a magnetic head 16 adapted to transduce the tape 12, and an endmark detector 17 for detecting a conducive patch 14 as endmark. The capstan 15 is rotatably supported by a suitable bearing (not shown) mounted to the deck 10 thereunder and upwardly extends through a hole (not shown) bored through the deck. The capstan 15 is adapted to be rotatably driven by an electrical motor (not shown). The endmark detector 17 includes a pair of feeler contacts which are electrically separated from each other and shorted by the conductive patch 14 on the tape 12.

Numeral 18 indicates a retention member which holds the cartridge 11 that will be laterally inserted in the player the direction of the arrow A and which places the cartridge, as will be described later, in a play position with respect to the tape driving capstan 15 and the magnetic head 16. The retention member 18 is slidably supported by guides 19*a*, 20*a* in the direction perpendicular to the direction of the arrow A.

Figure 1:
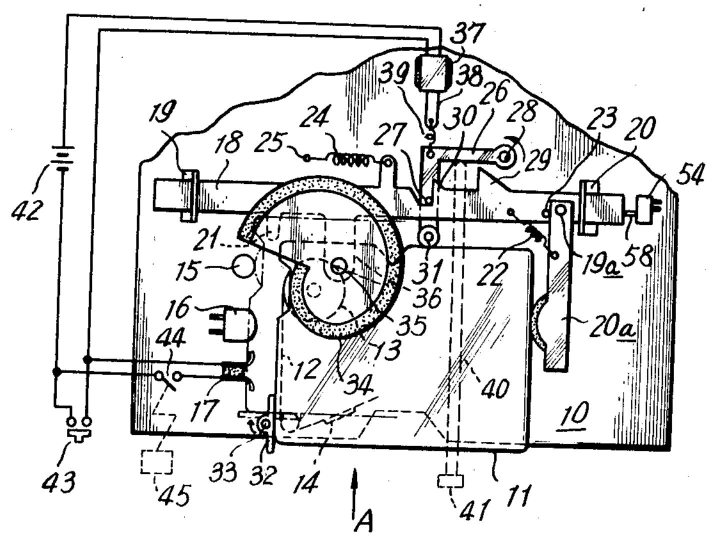
FIG. 1 is a representation schematically showing one embodiment of a tape cartridge play control apparatus in accordance with the present invention employed for an endless magnetic tape cartridge player.

Pivoted on a pin 19 at one portion of the member 18 is a rear arm 20, and a front arm 21 projects from the other portion thereof. The rear arm 20 is biased in the clockwise direction by a spring 22 but inward movement of the rear arm is limited by a stopper pin 23 on the member 18. A comparatively heavy tension spring 24 is interposed between the rentention member 18 and a pin 25 connected to the deck 10 to normally urge the member 18 in the leftward direction. The leftward movement of the retention member 18 due to the tension spring 24 may be arrested in a first position when a pin 27 on a substantially L-shaped stopper lever 26 pivoted to an axis 28 mounted to the deck 10 engages the projection 29 of the member 18 or in a second position when the pin 27 engages the projection 30 of the member 18. The retention member 18 in FIG. 1 is shown as being retained in the second position. The stopper lever 26 is biased in the direction of the arrow as shown by a spring (not shown) to maintain engageable relationship between the projections 29 or 30. A roller 31 is mounted to the free end of the stopper lever 26. The roller 31 is adapted to be pressed against the side wall of the cartridge when the retention member 11 is retained in the second position and the cartridge 11 to be played is inserted in the player in the direction of the arrow A, with the stopper lever 26 being swung to a position where the pin 27 on the stopper lever 26 disengages from the projection 30 whereby the retention member 18 is swung to the first position by the bias of the tension spring 24. During the time that the retention member 18 is moved to the first position, the cartridge inserted in the player housing is forwardly moved as the rear edge thereof is depressed by the rear arm 20 and the cartridge is guided by a guide 32 pivoted to a pin 33 and then moved into the play position where it is played by the capstan 15 and the magnetic head 16. Where the retention member 18, is retained in the first position by the projection 29 in engagement with the pin 27 on the stopper lever 26, the rear arm 20 is counterclockwise rotated against the bias of the spring 22 to obtain pressure between the capstan and the pinch roller 13 in the cartridge in the play position in aid of the bias of the spring 22. In FIG. 1, the cartridge is shown by the dotted lines as being placed in the play position by the retention member 18. The guide 32 is normally biased by a spring (not shown) to a position as shown by the solid lines to guide the cartridge to be inserted in the direction of the arrow A. The guide 32 also functions to guide the cartridge to be moved into the play position as mentioned above. In this instance, the guide 32 is rotated to assume a position indicated by the dotted lines.

A moving means for moving the retention member 18 from the first position to the leftward direction and for retracting the cartridge 11 from the play position, includes a rubber covered frictional cam wheel 34 rotatably supported by an axis 35 mounted to a bent arm 36 of the retention member 18. The cam wheel as will be described later, is rotatably driven by engagement with the capstan 15 when the retention member 18 disengages from the stopper lever 26 and is moved from the first position to the left ward direction by the bias of the tension spring 24.

The stopper lever 26 is connected through a spring 39 to a plunger 38 for a solenoid 37 rigidly mounted to the deck 10 and is swung to disengage the retention member 18 when the solenoid 37 is energized. Otherwise, the stopper lever 26 may be moved to disengage the retention member 18 by manually pressing a push rod 40 shown by the dotted lines of which one end is opposite to the stopper lever 26 and the other end 41 projects forwardly of the player housing at the front portion thereof. The solenoid 37 is connected through a normally opened push button switch 43 to a power source 42. A series connection of the endmark detector 17 and a switch 44 is connected in parallel with the push button switch 43. The switch 44 is built in a variable resistor 45 (indicated by the dotted lines) for adjustment of reproducing sound volume, incorporated in a reproducing circuit for the tape cartridge player and is adapted to be closed when the variable resistor 45 is operated to minimize the reproducing sound volume.

If the variable resistor 45 is operated so as to close the switch 44 when the cartridge 11 is played, the solenoid 37 is energized in pulse fashion by the power source 42 in response to passage of the conductive patch 14 as endmark on the tape 12 over the endmark detector 17. The solenoid 37 may be energized by the power source 42 when the push button switch 43 is manually and operatively closed. Energization of the solenoid 37 causes the lever 26 to swing to disengage the pin 27 from projection 29 whereby the retention member 18 is moved by the bias of the tension spring 24 from the first position to the leftward direction. As a result, the cam wheel 34 is pressed against the capstan 15 and is rotated. As shown, the cam wheel 34 has the minimum eccentric portion, and the minimum eccentric portion is initially pressed against the capstan 15 so that the retention member 18 is gradually moved in the rightward direction against the bias of the tension spring 24 as the cam wheel is rotated. And, by the time when the maximum eccentric portion of the cam wheel is engaged by the capstan, the retention member 18 is moved to the position slightly and rightwardly of the second position as shown in FIG. 1. The cam wheel 34 is substantially rotated through a revolution and the maximum eccentric portion is away from the capstan 15 to allow the retention member 18 to be retained in the second position in FIG. 1 as the pin 27 on the stopper lever 26 engages the projection 30. When the retention member 18 is moved from the first position back into the second position, the cartridge 11 which was in the play position is moved into a non-play position where the pinch roller 13 is away from the capstan 15 as the front edge of the cartridge is pressed by the front arm 21. Consequently, the play of the cartridge 11 is automatically suspended since the retention member 18 is moved from the first position to the second position.

Figure 2:
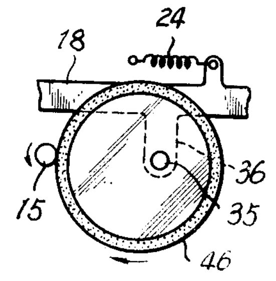
FIG. 2 is a representation showing a modified form of the frictional wheel shown in FIG. 1.
Figure 3:
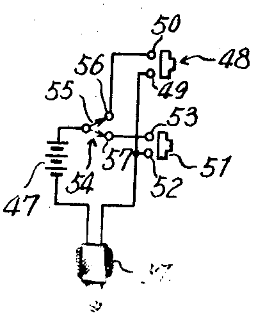
FIG. 3 is a diagram showing an alternative control circuit for the solenoid in FIG. 1.

The retention member 18 may be moved by a rotational force of the capstan 15 even if an eccentric frictional cam wheel 46 as shown in FIG. 2 is used instead of the cam wheel 24. In FIG. 2, similar numerals are used to illustrate like parts in FIG. 1. The eccentric frictional wheel 46 is adapted not to be rotated due to slippage with respect to the capstan 15 when the retention member 18 is retained in the first position and second position, however, the frictional can wheel 46 may be rotated in the direction of the arrow as shown under the bias of the tension spring 24 upon engagement with the capstan 15 when the retention member 18 is disengaged from its retention. The maximum eccentric portion of the wheel 46 is adapted to be opposed to the capstan 15 when the retention member 18 is engaged with the second position. In response to disengagement of the retention member 18, the wheel 46 is rotated by the capstan 15 and made through a half-revolution at which time the retention member 18 is retained in the first position whereby pressure between the wheel 46 and the capstan 15 is diminished to end rotation of the wheel 46. Next, the retention member 18 in the first position is disengaged from its retention, the wheel 46 is pressed against the capstan 15 and initiates its rotation to thereby move the retention member 18 from the first position to the rightward direction and returned to the second position at a point where the wheel 46 is rotated from the initial position at the same time rotation of the wheel 46 is suspended. The solenoid 37 is provided with an exciting coil (not shown) of which one end is connected to one pole of a power source 47, with the other end of the coil being connected to one contact 49 of a manually operated normal-opened start switch 48 for instructing initiation of the play of the cartridge and to one contact 52 of a manually operated normal-opened stop switch 51 for instructing termination of the play of the cartridge. The other contact 50 of the start switch 48 is connected to one fixed contact 56 of a changing switch 54 is provided on the deck 10 and actuated by the retention member 18 while the other contact 53 of the stop switch 51 is connected to the other fixed contact 57 of the changeing switch 54. The changing switch 54 includes a common movable contact 55 which is connected to the other electrode of the power source 47 and also selectively connected to the fixed contact 56 or 57. An actuator 58 for the changing switch 54 is depressedly operated by the retention member 18 when in the second position to thus allow the movable contact 55 to come in contact with the contact 56 as shown in FIG. 3 whereby when the member 18 is leftwardly moved from the second position to release operation of the actuator 58 the movable contact 55 is moved away from the contact 56 and comes in contact with the contact 57. Now, the start switch 48 is manually operated and closed when the retention member 18 is retained in the second position, the solenoid 37 is energized by the power source 47 to release the member 18 to move the member 18 into the first position allowing the cartridge 11 to move in the play position to start the play of the cartridge. On the other hand, the stop switch 51 is manually operated and closed when the cartridge 11 is played to energize the solenoid 37 by means of the power source 47 whereby the retention member 18 is disengaged from its retention and is moved from the first position to the second position to move the cartridge 11 out of the play position to the second position. If the control circuit shown in FIG. 3 is employed to operate the start switch 48, the play of the cartridge is initiated and terminated when the stop switch 51 is operated so that this is very convenient to instruct initiation or termination of the play of the cartridge.

Figure 4:
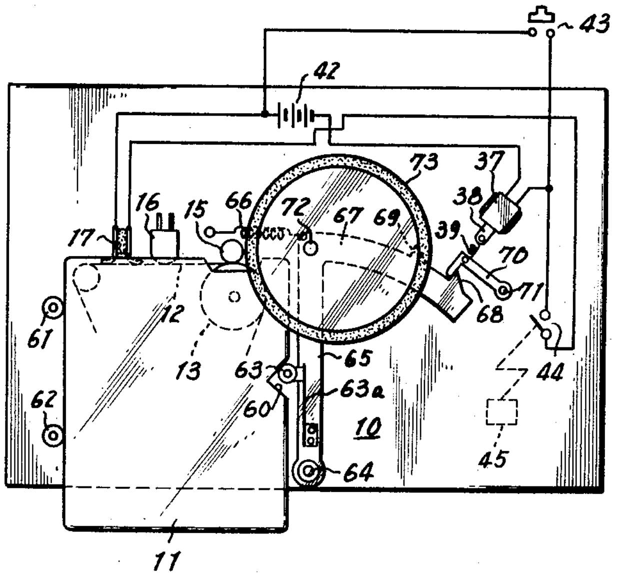
FIG. 4 is a representation schematically showing alternative embodiment of the tape cartridge play control apparatus in accordance with the present invention employed for an endless magnetic tape cartridge player.

FIG. 4 shows another embodiment of the tape cartridge play control apparatus according to the present invention. In this instance, the cartridge 11 is longitudinally inserted in the player for its play. In FIG. 4, similar numerals are used to illustrate like parts in FIG. 1. The deck is provided with a way for the cartridge 11 and guide members 61, 62, and 63 mounted thereto for urging the cartridge 11 into the play position. The guide member 63 is mounted to a free end of a leaf spring 63a one end of which is mounted to a retention member 65 swingably pivoted to an axis 64 one end of which is mounted to the deck 10. The guide member or pressure member 63 is pressed into a notch 60 on the side of the cartridge 11. As the pressure member 63 presses the inclined wall of the notch 60 in the cartridge 11, a forward force is exerted to the cartridge 11, the cartridge 11 is urged to the play position with respect to the magnetic head 16 adapted to transduce the tape 12 within the cartridge 11 and the rotatary capstan 15 for driving the tape 12.

The retention member 65 is given an elastic force by which the guide or pressure member 63 is pressed against the notch 60 of the cartridge 11. Rotation of the retention member 65 is arrested by projection 68 or 69, formed on arc portion 67 of the member 65, which engages a stopper lever 70 pivoted to a pin 71 connected to the deck 60. In FIG. 4, the stopper lever 70 is shown as being engaged with the projection 68 while the retention member 65 is shown as retained in a first position. Where the retention member 65 is retained in the first position against the bias of the tension spring 66, the pressure member 63 presses the notch 60 of the cartridge 11 while the cartridge is urged against the play position and is thus played. The stopper lever 70 is normally biased by a spring (not shown) to maintain engagement with the projection 68 or 69. The stopper lever 70 similar to the stopper lever 26 (FIG. 1) is connected through the spring 39 to the plunger 38 of the solenoid 37. The stopper lever is moved to disengage the projection 68 or 69 by the solenoid 37 when the solenoid 37 is energized by the power source 42 thereby disengaging the retention member 65. An axis 72 of retention member 65 carries a rubber covered eccentric frictional idler cam wheel 73 which is pressed against the capstan and is rotated when the member 65 disengages from the stopper lever 70 and is counterclockwise swung by the bias of the tension spring 66.

If the push button switch 43 is manually operated and closed when the cartridge 11 is played, the solenoid 37 is energized by the power source 42 so that the stopper lever 70 is moved to disengage the projection 68 to release retention of the retention member 65. This retention member 65 is slightly and counterclockwise swung by the bias of the tension spring 66 to allow the frictional cam wheel 73 to abut against the capstan 15. The cam wheel 73 has the minimum eccentric portion initially abuts against the capstan 15 and is rotatably driven in the clockwise direction by the capstan 15. Accordingly, as the wheel 73 is rotated, the retnetion member 65 is gradually and clockwise swung to rotate the wheel 73 through a half revolution. And, the maximum eccentric portion passes through the capstan 15, swingable movement of the retention member 65 is reversed to assume counterclockwise direction. As soon as possible the retention member 65 is counterclockwise swung, the projection 69 engages the stopper lever 70 to arrest swingable movement of the retention roller 65 thereby retaining the latter in the second position. This will diminish pressure derived from the tension spring 66 between the wheel 73 and the capstan 15, and the wheel 73 is prevented from its rotation at a position where the maximum eccentric portion is opposite to the capstan.

When the retention member 65 is moved from the first position to the second position by rotation of the wheel 73, the guide member 63 is away from the notch 60 of the cartridge 11. As a result, the cartridge 11 does not provide the forward force applied by the guide member 63 and thus slightly moves out of the play position to diminish pressure between the pinch roller 13 and the capstan 15 thereby stopping the tape running. In other words, the play of the cartridge 11 is automatically ended in response to movement of the retention member 65 from the first position to the second position.

Next, upon closing of the switch 43 by manual operation, the solenoid 37 is energized by the power source 42 and the stopper lever 70 disengages the retention member 65 to allow the wheel 73 to abut against the capstan 15 and to be rotated. This allows the retention member 65 to be clockwise swung from the second position. When the wheel 73 is rotated and reaches the position as shown, the projection 68 engages the stopper lever 70 to retain the retention member in the first position at the same time the wheel 73 is prevented from its rotation. Movement of the retention member 65 to the first position allows the guide member 63 to press the notch 60 of the cartridge 11 to thereby urge the cartridge in the play position for its play.

Although the invention has been described with reference to specific embodiments, it is apparent that the invention is not to be limited to the embodiments as illustrated, and, accordingly, changes and variations may be made without departing from the spirit and scope of the invention as defined in the appended claims.

What is claimed is:

1. A tape cartridge play control apparatus for an endless magnetic tape cartridge player, the player having a player deck into which is inserted a cartridge which carries an endless magnetic tape and a pinch roller used for driving the tape and on which is provided a rotary capstan for driving the tape in cooperation with the pinch roller, and at least one magnetic head adapted to transduce the tape, comprising: a retention member movably provided on the player deck having means for engaging a cartridge inserted into the deck, said retention member being operable to urge an engaged cartridge from a non-play position to a play position where the tape cartridge is driven by the capstan and played back by the magnetic head; a tension spring biasing the retention member in the direction that the latter urges the engaged cartridge to the play position; stopper means for retaining the retention member in a first position where the latter places the cartridge in the play position or in a second position where the cartridge is in the non-play position; a control means for controlling operation of the stopper means; driving means for moving the retention member from the first position to the second position and operable when the stopper means is operated by the control means to disengage the stopper member from retention of the retention member in the first position, a shaft carried by said retention member, said driving means having a frictional cam wheel mounted for eccentric rotation about said shaft on the retention member, said frictional cam wheel being pressed against the capstan by the tension spring and rotatably driven by the capstan when the retention member in the first position is disengaged from the stopper means, said frictional cam wheel being operable to move the retention member from the first position to the second position through the eccentric rotation of the frictional cam wheel and at the same time move the cartridge away from the play position to eliminate pressure between the pinch roller and the capstan thereby ending the tape driving.

2 A tape cartridge play control apparatus for an endless magnetic tape cartridge player in accordance with claim 1, wherein said retention member includes front and rear arms for grasping said cartridge at its front and rear edges, respectively, the cartridge being urged to and played in said play position as the rear edge thereof is pressed by the rear arm when the retention member is in said first position, the cartridge being moved out of the play position as the front edge thereof is pressed by the front arm when the retention member is moved from the first position to the second position.

3. A tape cartridge play control apparatus for an endless magnetic tape cartridge player in accordance with claim 1, wherein a leaf spring having one free end is mounted at the other end to said retention member, said leaf spring carrying a pressure member at its free end, the retention member being operable when in said first position to allow the pressure member to press against a notch formed on the side wall of said cartridge under the bias of the leaf spring, the cartridge being urged to said play position by the forward force exerted by the retention member, the pressure member being moved away from the notch when the retention member is moved to said second position whereby pressure between said pinch roller and said capstan is eliminated to suspend the tape driving thereby ending the play of the cartridge.

4. A tape cartridge play control apparatus for an endless magnetic tape cartridge player in accordance with claim 1, wherein said stopper means comprises a stopper lever movably provided on said player deck, said retention member having two projections thereon spaced from one another, the stopper lever being adjacent said projections and being operable to selectively engage said projections when the retention member is moved by said tension spring.

5. A tape cartridge play control apparatus for an endless magnetic tape cartridge player in accordance with claim 4, wherein said control means includes a solenoid coupled to said stopper lever and operable when energized to move the stopper lever to disengage stopper lever from said projections, and a control circuit for controlling current supply to the solenoid.

6. A tape cartridge play control apparatus for an endless magnetic tape cartridge player in accordance with claim 5, wherein said control circuit comprises a power source for energizing said solenoid, a switch manually operated and closed at any time when desired, and a detector having a pair of feeler contacts electrically insulated from each other, the detector being provided on said player deck and being operable to be shorted by a conductive patch on the tape, the solenoid, the switch and the detector being interconnected in series with the power source, said solenoid being operable, when said manually operated switch is closed, to be energized by the power source in response to passage of the conductive patch on the tape through the detector thereby disengaging said retention member from said stopper lever to permit the retention member to be moved to said first position by said cam wheel to automatically end the play of the cartridge.

* * * * *

PO-1050
(5/69)

UNITED STATES PATENT OFFICE
CERTIFICATE OF CORRECTION

Patent No. 3,684,297 Dated August 15, 1972

Inventor(s) Itsuki Ban

It is certified that error appears in the above-identified patent and that said Letters Patent are hereby corrected as shown below:

In the heading insert -- Claims priority from Japanese Patent Application 1969-38718, filed May 21, 1969 in Japan --

Signed and sealed this 13th day of February 1973.

(SEAL)
Attest:

EDWARD M.FLETCHER,JR.
Attesting Officer

ROBERT GOTTSCHALK
Commissioner of Patents